United States Patent
Wang et al.

(10) Patent No.: US 11,270,526 B2
(45) Date of Patent: Mar. 8, 2022

(54) TEACHING ASSISTANCE METHOD AND TEACHING ASSISTANCE SYSTEM USING SAID METHOD

(71) Applicants: SHENZHEN INSTITUTES OF ADVANCED TECHNOLOGY CHINESE ACADEMY OF SCIENCES, Shenzhen (CN); SHENZHEN SIBIKU TECHNOLOGY CO., LTD, Shenzhen (CN)

(72) Inventors: Shuqiang Wang, Shenzhen (CN); Yongcan Wang, Shenzhen (CN); Yue Yang, Shenzhen (CN); Yanyan Shen, Shenzhen (CN); Minghui Hu, Shenzhen (CN)

(73) Assignees: SHENZHEN INSTITUTES OF ADVANCED TECHNOLOGY CHINESE ACADEMY OF SCIENCES, Shenzhen (CN); SHENZHEN SIBIKU TECHNOLOGY CO., LTD, Shenzhen (CN)

(*) Notice: Subject to any disclaimer, the term of this patent is extended or adjusted under 35 U.S.C. 154(b) by 251 days.

(21) Appl. No.: 16/623,397

(22) PCT Filed: Aug. 7, 2017

(86) PCT No.: PCT/CN2017/096217
§ 371 (c)(1),
(2) Date: Dec. 17, 2019

(87) PCT Pub. No.: WO2019/028592
PCT Pub. Date: Feb. 14, 2019

(65) Prior Publication Data
US 2020/0175264 A1 Jun. 4, 2020

(51) Int. Cl.
*G06N 3/08* (2006.01)
*G09B 19/00* (2006.01)
(Continued)

(52) U.S. Cl.
CPC ........... *G06V 40/174* (2022.01); *G06N 3/084* (2013.01); *G06V 20/40* (2022.01); *G06V 20/52* (2022.01); *G06V 40/20* (2022.01); *G09B 19/00* (2013.01)

(58) Field of Classification Search
None
See application file for complete search history.

(56) References Cited

U.S. PATENT DOCUMENTS 9,792,492 B2 * 10/2017 Soldevila ............. G06K 9/6201
2004/0180317 A1 * 9/2004 Bodner .................... G09B 7/00
434/353
(Continued)

FOREIGN PATENT DOCUMENTS

| CN | 102945624 A | 2/2013 |
|---|---|---|
| CN | 103559812 A | 2/2014 |

(Continued)

OTHER PUBLICATIONS

Chen J, Qiu J, Ahn C. Construction worker's awkward posture recognition through supervised motion tensor decomposition. Automation in Construction. May 1, 2017;77:67-81. (Year: 2017).*
(Continued)

*Primary Examiner* — Michelle M Entezari (57) ABSTRACT

A teaching assistance method and a teaching assistance system using said method, the teaching assistance method comprising implementing behaviour detection of students in classroom images by means of using a trained depth tensor column network model, thus providing higher image recognition precision and reducing the hardware requirements for (Continued)

algorithms, and being able to be used on an embedded device, reducing the usage costs of the teaching assistance method; in addition, a teaching assistance system using said teaching assistance method has the same advantages.

13 Claims, 6 Drawing Sheets

(51) Int. Cl.
*G06V 40/16* (2022.01)
*G06V 20/40* (2022.01)
*G06V 20/52* (2022.01)
*G06V 40/20* (2022.01)

(56) References Cited

U.S. PATENT DOCUMENTS

| | | | |
|---|---|---|---|
| 2015/0044657 A1 | 2/2015 | Dalal et al. | |
| 2016/0174902 A1* | 6/2016 | Georgescu | G06T 7/0012 600/408 |
| 2016/0359941 A1* | 12/2016 | Kvaal | H04N 7/147 |
| 2017/0017857 A1* | 1/2017 | Wolf | G06K 9/00718 |
| 2017/0262735 A1* | 9/2017 | Ros Sanchez | G06K 9/4628 |
| 2018/0300830 A1* | 10/2018 | Darnell | G06K 9/00302 |
| 2019/0197236 A1* | 6/2019 | Niculescu-Mizil | H04L 63/1441 |
| 2019/0266490 A1* | 8/2019 | Rippel | G06N 20/00 |
| 2021/0019630 A1* | 1/2021 | Yao | G06K 9/6257 |
| 2021/0279475 A1* | 9/2021 | Tusch | G06K 9/00248 |

FOREIGN PATENT DOCUMENTS

| | | |
|---|---|---|
| CN | 106097790 A | 11/2016 |
| CN | 106778539 A | 5/2017 |
| CN | 106778745 A | 5/2017 |

OTHER PUBLICATIONS

Perera M, Kudoh S, Ikeuchi K. Keypose and style analysis based on low-dimensional representation. Journal of Information Processing Society of Japan. Feb. 2009;50:1234-49. (Year: 2009).*

Jia C, Kong Y, Ding Z, Fu YR. Latent tensor transfer learning for RGB-D action recognition. InProceedings of the 22nd ACM international conference on Multimedia Nov. 3, 2014 (pp. 87-96). (Year: 2014).*

Liu, Hui, et al. "Student Behavior Recognition From Heterogeneous View Perception in Class Based on 3-D Multiscale Residual Dense Network for the Analysis of Case Teaching." Frontiers in neurorobotics 15 (2021). (Year: 2021).*

Leclercq, Éric, and Marinette Savonnet. "A tensor based data model for polystore: an application to social networks data." Proceedings of the 22nd International Database Engineering & Applications Symposium. 2018. (Year: 2018).*

Fang, Zheng, et al. "Spatial-temporal graph ode networks for traffic flow forecasting." Proceedings of the 27th ACM SIGKDD Conference on Knowledge Discovery & Data Mining. 2021. (Year: 2021).*

Dai, Cheng, et al. "Hybrid Deep Model for Human Behavior Understanding on Industrial Internet of Video Things." IEEE Transactions on Industrial Informatics (2021). (Year: 2021).*

International Search Report issued in corresponding International application No. PCT/CN2017/096217, dated May 8, 2018.

Written Opinion of the International Searching Authority for No. PCT/CN2017/096217.

* cited by examiner

TEACHING ASSISTANCE METHOD AND TEACHING ASSISTANCE SYSTEM USING SAID METHOD

TECHNICAL FIELD

The present disclosure relates to the teaching assistance field, and in particular, to a teaching assistance method and a teaching assistance system using the method.

BACKGROUND

In general teaching activities, due to the great difference between the numbers of students and of teachers in the class, a teacher in class does not have much time and energy to determine learning states of the students by observing learning behavior and expression of each student. This makes the teacher be unable to accurately understand the learning state of each student and the accepted extent of the content taught in this time. It is prone to result in that "the teacher talks about the teacher, and the student talks about the student" in class, and then the whole teaching activity is torn apart; this also makes the teacher be unable to teach targetedly, and thus teaching quality and efficiency are seriously affected. Therefore, teaching aid systems that can be used in the course of students have always been a key issue of concern to the education community. The teaching assistant systems are designed to assist teachers to smoothly carry out teaching activities. The current teaching aid system research emphasizes functionality, and is mainly developed from aspects of providing students with an independent learning environment, providing students with sufficient learning resources and reducing the workload of teachers. By using different technical means to design intelligent assistant systems, teaching effect of teachers and learning efficiency of students are improved.

In the prior art, a Chinese invention patent with a published No. CN106097790A discloses a teaching assistance device, which recognizes images in an teaching activity by an image recognition technology, thereby determines whether a student in class does things having nothing to do with the class, and informs a teacher to make corresponding treatment according to the recognition result.

Since the prior art neither discloses the image recognition method and process of its image recognition module, nor discloses how does its image recognition module realize comparing a current image with a pre-stored image and determine the comparison result, those skilled in the art cannot specifically achieve technical effect of assistance a teaching process according to the solution of the prior art. Therefore, the existing teaching assistance method has defects.

SUMMARY

In order to solve the above technical problems existing in the prior art, a purpose of the present disclosure is to provide a teaching assistance method with higher image recognition accuracy and a teaching assistance system using the method.

In order to solve the above technical problems, a technical solution adopted by the present disclosure is: a teaching assistance method, comprising the following steps:

s1, by a capturing module, capturing a classroom image in the scene in real time, and transmitting the classroom image to a recognition module;

s2, by the recognition module, analyzing the classroom image, and determining students with abnormal behaviors in the classroom image;

s3, by a prompting module, informing a teacher with a recognition result of the recognition module;

the step s2 includes the following step:

s21, by the recognition module, using a trained depth tensor train network model to perform behavior detection for students in the classroom image.

Preferably, the step s2 further includes the following step:

s22, by the recognition module, using a trained depth tensor train network model to perform facial expression recognition for students in the classroom image.

Preferably, the step s22 specifically includes the following steps:

s221, by a human face detection sub-unit, recognizing human face regions of the students in the classroom image captured by the capturing module;

s222, by a convolutional neural network classifier, performing facial expression recognition for detected human face regions.

Preferably, the step s1 includes the following steps:

s11, by the recognition module, respectively mounting image capturing devices in left, middle, and right regions in the front of a classroom;

s12, by the image recognition module, taking upper body images of all students in a class as capturing targets.

Preferably, the method further comprises the following step: s4, by a storage module, synchronously storing the recognition result.

Preferably, the step s4 includes the following steps:

s41, according to classes, making the recognition result corresponding to each student into a student electronic profile;

s42, according to the student electronic profiles, drawing student learning status curves, which are configured to facilitate a teacher to give targeted guidance to students in combination with currently taught content and test scores.

Preferably, before the step s1, the method further comprises the following steps:

q1, establishing a data set;

q2, training the depth tensor train network model.

Preferably, the step q1 includes the following steps:

q11, by the capturing module, photographing class images for a long time in the classroom and storing the class images;

q12, selecting a student image existing abnormality to label.

Preferably, the step q2 includes the following steps:

q21, by multiple convolution layers of a neural network model, extracting a labeled abnormal feature in a student image, and calculating according to the abnormal feature and a decomposed full connection layer weight matrix to obtain an output predict value;

q22, establishing a loss function according to a difference between the output predict value and a real labeled value for a student having abnormal behavior in the student image;

q23, adjusting network parameters according to the loss function, and obtaining the trained depth tensor train network model.

In order to solve the above technical solutions, the present disclosure further provides a teaching assistance system, which is provided with a capturing module, a recognition module connected with the capturing module, and a prompting module connected with the recognition module; wherein, the capturing module is configured to capture a classroom image in the scene in real time, and transmit the classroom image to the recognition module;

the recognition module is configured to analyze the classroom image, and determine students with abnormal behaviors in the classroom image; wherein the recognition module includes:

a behavior detection unit configured to use a trained depth tensor train network model to perform behavior detection for students in the classroom image;

the prompting module is configured to inform a teaching teacher with a recognition result of the recognition module.

Preferably, the teaching assistance system is further provided with a storage module connected with the recognition module; the storage module is configured to synchronously store the recognition result and perform edit and analysis;

the recognition module further includes:

a facial expression recognition unit configured to use the trained depth tensor train network model to perform facial expression recognition for students in the classroom image;

wherein the facial expression recognition unit includes a human face detection sub-unit and a convolutional neural network classifier.

Compared with the prior art, the teaching assistance method of the present disclosure, by adopting the trained depth tensor train network model to perform behavior detection for students in the classroom image, can provide higher image recognition accuracy and reduce requirements of algorithms for hardware, and can be used in an embedded device, so that use cost of the teaching assistance method is lowered.

Further, the present disclosure further adopts the trained depth tensor train network model to perform facial expression recognition for students in the classroom image, such that recognition accuracy of a teaching assistance system for abnormal behaviors of students in class is higher.

A teaching assistance method adopting the method also has the above advantages.

DETAILED DESCRIPTION

Embodiments of the present disclosure are further described in detail below with reference to FIG. 1 to FIG. 11.

Figure 1:
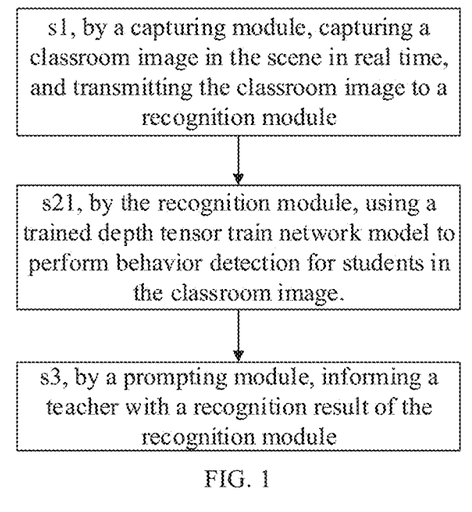
FIG. 1 is a basic flow chart of a teaching assistance method.

As shown in FIG. 1, a teaching assistance method comprises the following steps:

s1, by a capturing module, capturing a classroom image in the scene in real time, and transmitting the classroom image to a recognition module;

s2, by the recognition module, analyzing the classroom image, and determining students with abnormal behaviors in the classroom image;

s3, by a prompting module, informing a teacher with a recognition result of the recognition module.

The step s2 includes the following step:

s21, by the recognition module, using a trained depth tensor train network model to perform behavior detection for students in the classroom image.

Specifically, the depth tensor train network model adopted in the step s21 is obtained by performing tensor train decomposition for a traditional fully connected layer matrix, greatly reduces parameter quantity of tensors of the fully connected layer matrix, improves algorithm efficiency, lowers requirement of algorithms for hardware, facilitates system disposition in the form of embedded devices, is easier and more simple to use and can lower cost, and thus is conducive to large scale promotion of the teaching assistance system.

Figure 2:
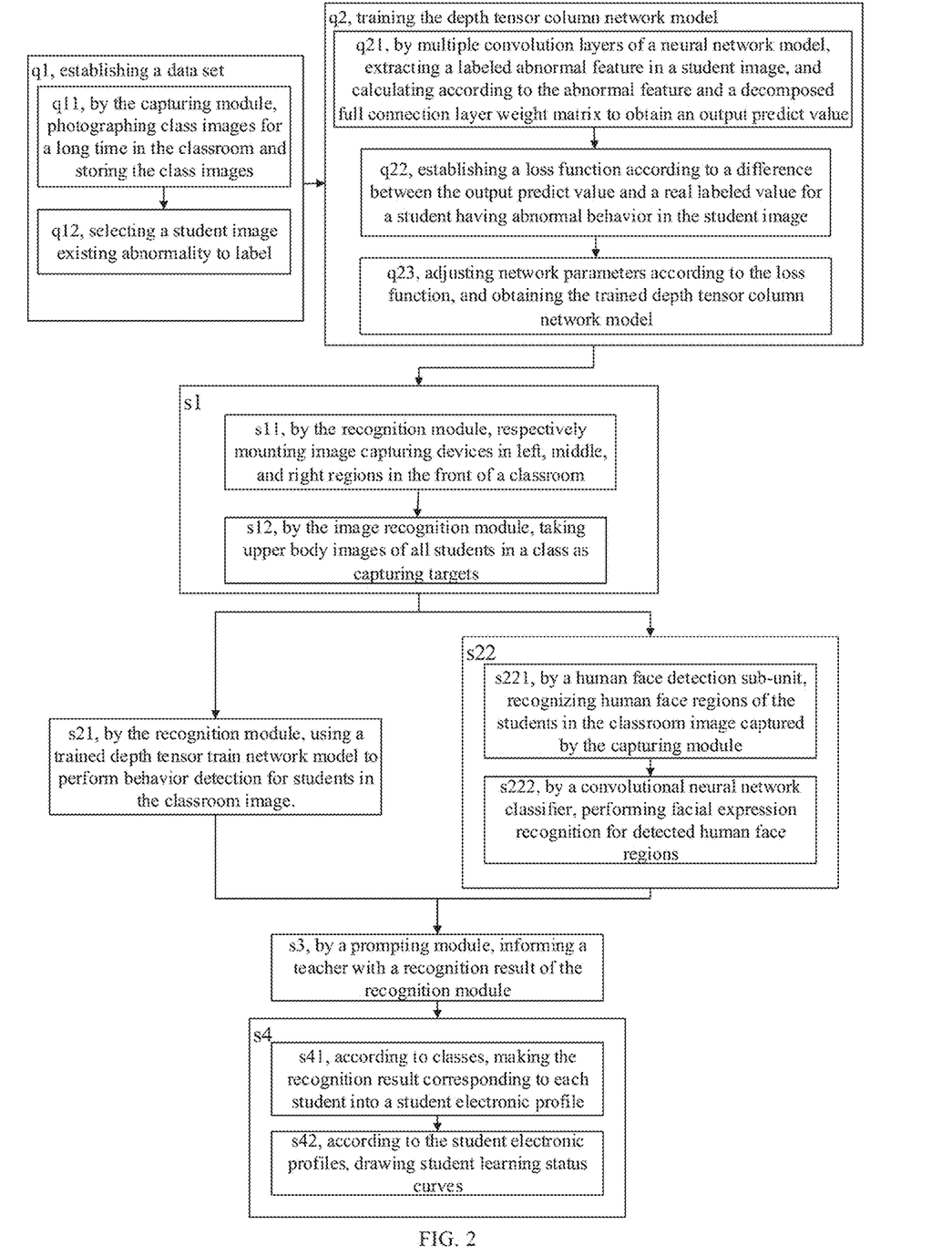
FIG. 2 is a detailed flow chart of a teaching assistance method.
Figure 3:
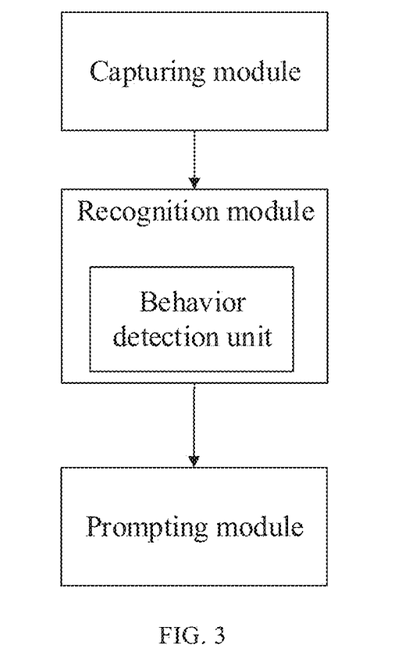
FIG. 3 is a structural schematic diagram of a teaching assistance system adopting the teaching assistance method of FIG. 1.
Figure 4:
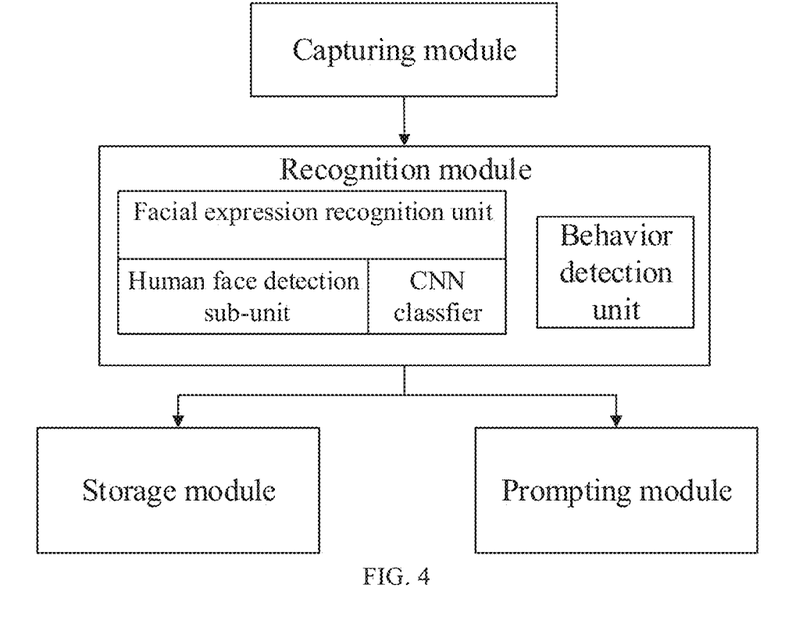
FIG. 4 is a complete structural schematic diagram of the teaching assistance system of FIG. 3.

As shown in FIG. 2, the step s2 further includes the following step:

s22, by the recognition module, using a trained depth tensor train network model to perform facial expression recognition for students in the classroom image.

The step s22 resets the core algorithm of image recognition, by performing combined behavior detection and facial expression recognition for student images, the depth tensor train network model obtains better recognition accuracy and efficiency. On the basis that the depth tensor train network model reduces model parameter quantity and improves system robust, the speed of using the teaching assistance system to detect abnormal behaviors and facial expressions of students in class in real time is improved effectively.

In this embodiment, the step s22 specifically includes the following steps:

s221, by a human face detection sub-unit, recognizing human face regions of the students in the classroom image captured by the capturing module;

s222, by a convolutional neural network classifier, performing facial expression recognition for detected human face regions.

In specific operations, since facial expression features are relatively detailed, it is inconvenient for the recognition module to directly extract facial expression features. Therefore, the present disclosure achieves facial expression recognition through the step s221 and the step s222. First, by the human face detection sub-unit, human face regions of the students are detected in the classroom image captured by the capturing module; thus, by the convolutional neural network classifier, facial expression recognition is performed for detected human face regions.

Figure 9:
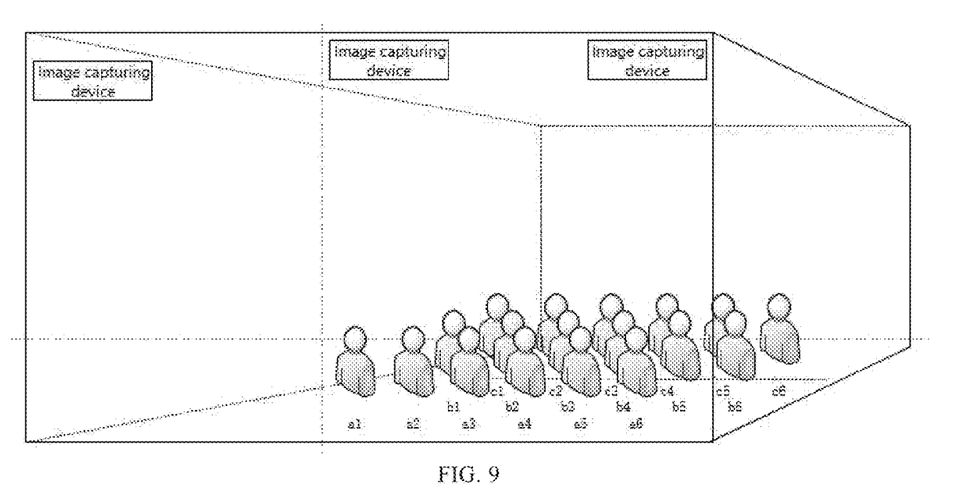
FIG. 9 is a schematic view of a disposing manner of a capturing module.

As shown in FIG. 9, the step s1 includes the following steps:

s11, by the recognition module, respectively mounting image capturing devices in left, middle, and right regions in the front of a classroom.

In other embodiments, it is also possible to mount image capturing devices in left and right regions in the front of a classroom or in more regions, thereby preventing students from being blocked when photographing in a single direction.

Moreover, in a preferred embodiment, in a normal teaching status, most students will basically not appear abnormal behaviors, such as confusion, daze, boredom, etc. Therefore, it is possible to set a photographing time interval for each image capturing device, so as to reduce sampling rates of images and save corresponding processing and storage resources.

s12, by the image recognition module, taking upper body images of all students in a class as capturing targets.

In specific implementation, it is basically possible to extract and recognize behaviors and facial expression features of students in class according to upper body images. By taking upper bodies as targets, it is possible to photograph image regions with rich features targetedly.

In this embodiment, the method further comprises the following step: s4, by a storage module, synchronously storing the recognition result.

In this embodiment, by synchronously storing the recognition result, it is possible to further analyze and utilize the recognition result from an overall direction. For example, by analyzing and estimating teaching effect and analyzing learning curves of students according to the recognition result, it is possible to carry out teaching activities more targetedly, such that sequent teaching works are more targeted, and teaching level and quality are improved as a whole.

Preferably, the step s4 includes the following steps:

s41, according to classes, making the recognition result corresponding to each student into a student electronic profile.

This is helpful to count and analyze detection and recognition results of a learning status of each student and actively traces a learning status of each student in class, such that the delay defect of the passive manner of determining a learning status of a student only according to a score of the student is avoided.

s42, according to the student electronic profiles, drawing student learning status curves, which are configured to facilitate a teacher to give targeted guidance to students in combination with currently taught content and test scores.

Moreover, it is also possible to combine the students' electronic profiles and teaching estimation of a teacher, so as to correct the current defect that it is too one-sided to use students' test scores as the main reference of class teaching quality estimation.

In this embodiment, before the step s1, the method further comprises the following steps:

q1, establishing a data set.

In specific implementation, it can be classified into establishing a data set for behavior detection and establishing a data set for facial expression recognition.

Specifically, when establishing a data set for behavior detection, establishing a suitable data set is a basis for whether students with abnormal behaviors can be correctly detected, and directly relates to good and bad system recognition performances. The capturing module is used to photograph teaching situations in class for a long time in a plurality of classrooms, and images containing students with abnormal behaviors are selected and labeled, wherein the abnormal behaviors refer to all behaviors presented as not carefully learning, such as sleeping, talking, making petty actions, dazing, etc. Since the blocking problem and the limitation of single perspective may exist, image capturing devices with left, middle, and right visual angles are used to capture images and respectively label. The images are simply processed and input by a fixed size to be adjusted into a proper model, so as to facilitate use in training the network model.

In other embodiments, it is also possible to extract facial expression features such as focus, interest, thinking, and so on, and train the depth tensor train network model, so that behaviors of learning carefully can also be recognized through the model.

When establishing the data set for facial expression recognition, since the present facial expression recognition will be performed in two steps: a human face detection is performed first, and then a facial expression recognition is performed, two data sets require being established, one is a classroom human face detection data set, and the other is a classroom students' learning facial expression data set.

Human Face Detection Data Set

In order to detect students' faces real-timely and accurately from classroom images captured by the image capturing module, a miniature human face detection data set in a classroom is established. The image capturing module is used to photograph classroom images captured according to teaching situations in class for a long time in a plurality of classrooms, the images are labeled, human face locations in the images are provided, and the images are simply processed to be adjusted into fixed sizes being suitable for model input, so as to facilitate use in training the network model.

Students' Learning Facial Expression Data Set

In order to enable a teaching teacher to understand a learning status of each student in class more accurately and real-timely, and meet the requirement of recognizing students' learning facial expressions, a students' learning facial expression data set is established for the scene of students learning in class. From the captured classroom images, picture blocks of students' facial expressions are cut, and relating facial expression labels corresponding to learning carefulness extents are provided, for example, focus, interest, thinking, confusion, dazing, boredom, and so on. It is conducive for a teaching teacher to grasp a learning state and a course understanding condition and manner of each student more conveniently and carefully, and thereby make real-time processing and adjustment.

q2, training the depth tensor train network model.

In specific implementation, training for behavior detection and for facial expression recognition can be performed independently. The difference is only that different data sets are adopted to train.

Specifically, a neural network model of abnormal behavior recognition of students in a classroom is based on a "depth tensor train network". First, behavior features of students in classroom images are extracted by automatic learning of multiple convolutional layers, and thus a full connection layer of studied classroom behavior feature information after IT decomposition (tensor train decomposition) is used to recognize students' classroom behaviors, and detect students having abnormal classroom behaviors.

Figure 7:
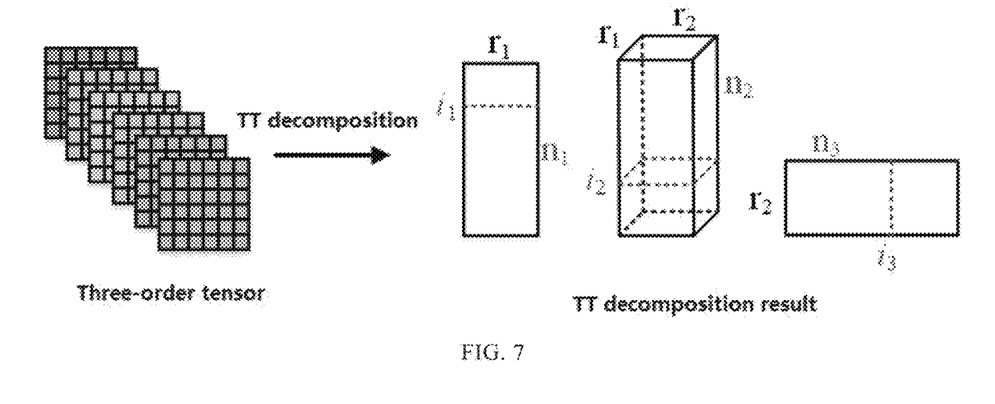
FIG. 7 is a schematic diagram of tensor train decomposition.

As shown in FIG. 7, tensor train decomposition (TT-decomposition) is a tensor decomposition model, wherein each element of a tensor is represented by a product of a plurality of matrices. Assuming that there exists a d-order tensor $\mathcal{A} \in R^{I_1 \times I_2 \times \cdots \times I_d}$ ($I_k$ represents the dimension of the k-th order), a tensor train of the tensor A is decomposed into:

$$\mathcal{A}(i_1, i_2 \ldots i_d) = \mathcal{G}_1(i_1) \mathcal{G}_2(i_2) \ldots \mathcal{G}_d(i_d)$$

wherein $\mathcal{G}_k(i_k)$ is a kernel matrix corresponding to the k-th order of the tensor A, of which the scale is $r_{k-1} \times r_k$, k=1, 2, ... d, $r_0 = r_d = 1$; $(r_0, r_1, \ldots r_d)$ is a TT-rank corresponding to the d-order tensor A performing tensor train decomposition, actually, $\mathcal{G}_k$ is a three-order tensor with a scale of $r_{k-1} \times I_k \times r_k$, therefore, $\mathcal{G}_k$ is also known as kernel tensor.

$$\mathcal{A} = \mathcal{G}_1 \mathcal{G}_2 \ldots \mathcal{G}_d$$

Figure 8:
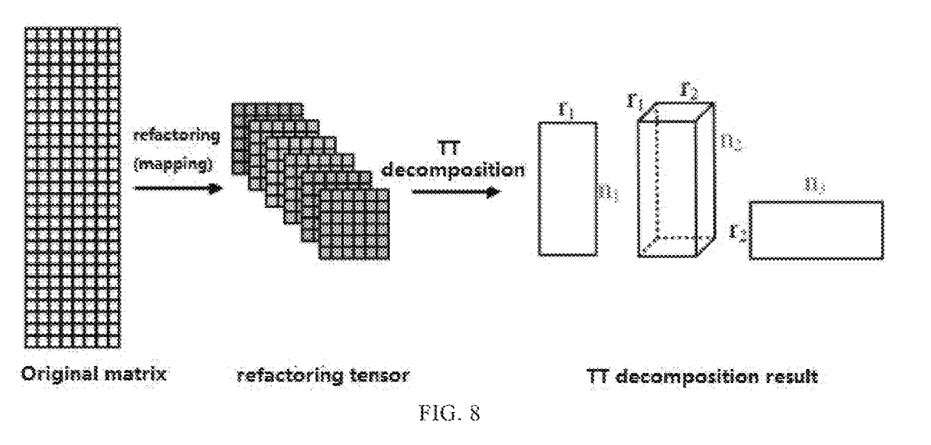
FIG. 8 is a schematic diagram of tensor train decomposition of a matrix.

As shown in FIG. 8, in tensor train decomposition of a matrix, assuming a matrix $A \in R^{M \times N}$, and a reconfiguration scheme is selected, such as the reconfiguration scheme: $M = \Sigma_{k=1}^d m_k$, $N = \Sigma_{k=1}^d n_k$; after selecting a reconfiguration scheme, first, tensor train decomposition of the matrix maps the matrix to a d-order tensor $\mathcal{A} \in R^{(m_1 n_1) \times (m_2 n_2) \times \ldots \times (m_d n_d)}$, and tensor train decomposition is performed for the tensor A, that is, $A \in R^{M \times N} \rightarrow \mathcal{A} \in R^{(m_1 n_1) \times (m_2 n_2) \times \ldots \times (m_d n_d)} \rightarrow \mathcal{A} = \mathcal{G}_1 \mathcal{G}_2 \ldots \mathcal{G}_d$.

As shown in FIG. 2; the step q1 includes the following steps:

q11, by the capturing module, photographing class images for a long time in the classroom and storing the class images;

q12, selecting a student image existing abnormality to label.

Since data containing images of abnormal behaviors may be relatively few, in order to avoid over-fitting of the model and improve anti-interference capability of the model for factors such as illumination changes, data enhancement is made for the captured and labeled data of images of abnormal behaviors of students in class. Processing such as changing a contrast, changing strengths of RGB channels, adding noise, and the like are performed for the images respectively, so as to add sample capacity and types of the image data.

In this embodiment, the step q2 includes the following steps:

q21, by multiple convolution layers of a neural network model, extracting a labeled abnormal feature in a student image, and calculating according to the abnormal feature and a decomposed full connection layer weight matrix to obtain an output predict value.

Figure 10:
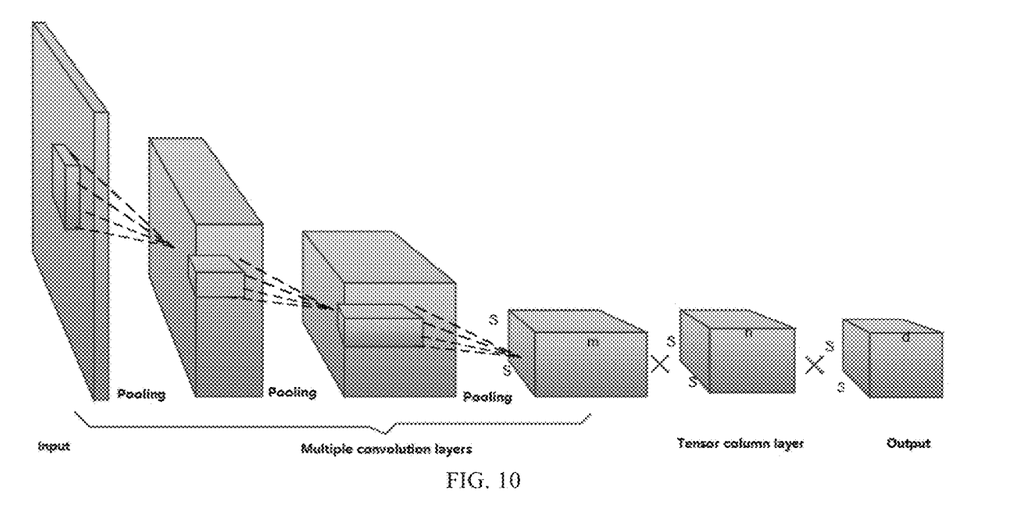
FIG. 10 is a structural schematic diagram of a depth tensor train network model adopted by behavior detection.

FIG. 10 shows a depth tensor train network model structure (here, only a three-layer convolution is taken as an example to illustrate). Steps of establishing the depth tensor train network model are as follows:

1. initializing network model parameters.
2. inputting images in a constructed abnormal behavior data set of students in class into the model to train.

The image is continuously convoluted and pooled, and a S×S×m tenstor A is output at the last convolution layer; that is, the original image is divided into a S×S grid, each grid unit corresponds to a part of the original classroom image, and image features in each grid unit corresponds to a m-dimensional vector in the tensor.

4. An improved full connection outputs a S×S×(5a) tensor, that is, abnormal behavior student detection bounding box coordinates (x, y, w, h), of which the number is a, corresponding to each grid unit and a recognition box are detected as the confidence of a student with abnormal behaviors. Wherein x and y are coordinates of the center point of the recognition box of the student with abnormal behaviors, w and h are respectively a width and a height of the recognition box of the student with abnormal behaviors, and the coordinates are normalized to be between 0 and 1.

Wherein, the improved full connection performs tensor train (TT) decomposition for a traditional full connection layer matrix, such that a parameter quantity of the full connection layer is greatly reduced, algorithm efficiency is improved, requirements for hardware are reduced, and thus it can be used in embedded devices. It improves the speed of real-timely detecting students with abnormal behaviors in class for the teaching assistance system, facilitates disposition in the form of an embedded device of the system, is more convenient, can lower cost, and is conducive to large scale promotion of the teaching assistance system for recognizing students with abnormal behaviors in class.

Tensor train decomposition (TT decomposition) is a tensor decomposition model, wherein each element of a tensor is represented by a product of a plurality of matrices. Tensor train decomposition of a matrix needs to first select a reconfiguration scheme, the matrix is first mapped into a d-order tensor, and tensor train decomposition is performed for the tensor. Here, tensor train decomposition is performed for a full connection layer weight matrix, and the following is detailed illustration for the process (in order to illustrate easily, some parameters are used as examples, but the specific implementation is not limited to specific parameters).

Figure 5:
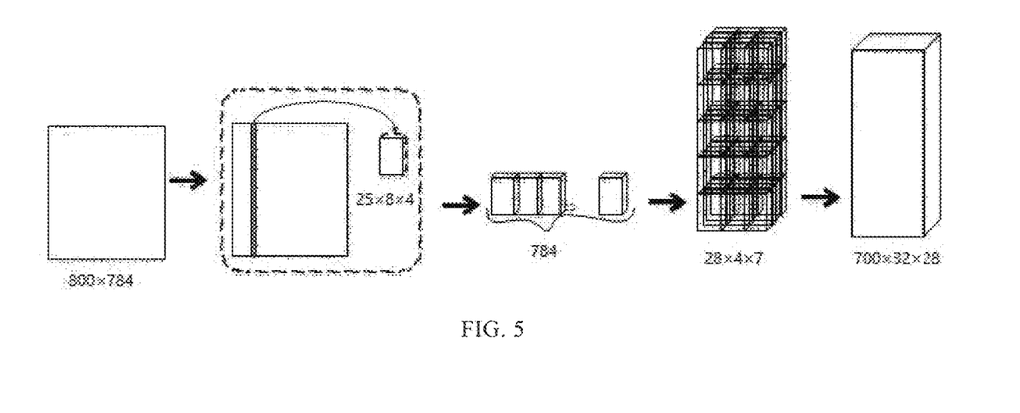
FIG. 5 is a schematic diagram of a full connection weight matrix folding and merging into third-order tensors.

In this embodiment, steps of tensor train decomposition for a full connection layer weight matrix comprise:

1. as shown in FIG. 5, rows and columns of a full connection weight matrix are all folded into d virtual dimensions; here, assuming that in a network model, S=4, m=50; n=49, that is; after a classroom image captured by the image capturing module is convoluted and pooled layer by layer, 4×4×50=800 features are extracted; the next hidden layer has 4×4×49=784 hidden nodes, thus a parameter of the full connection layer weight matrix is 800×784. For convenience; assuming d=3, and rows and columns of the full connection weight matrix are all folded into 3 virtual dimensions, as shown in the drawings.

2. as shown in FIG. 5, virtual dimensions corresponding to the rows and columns are merged, that is, the full connection weight matrix is reconfigured into a d-order tensor; according to the method of the above example, the original 800×784 weight matrix is reconfigured into a 700×32×28 3-order tensor.

Figure 6:
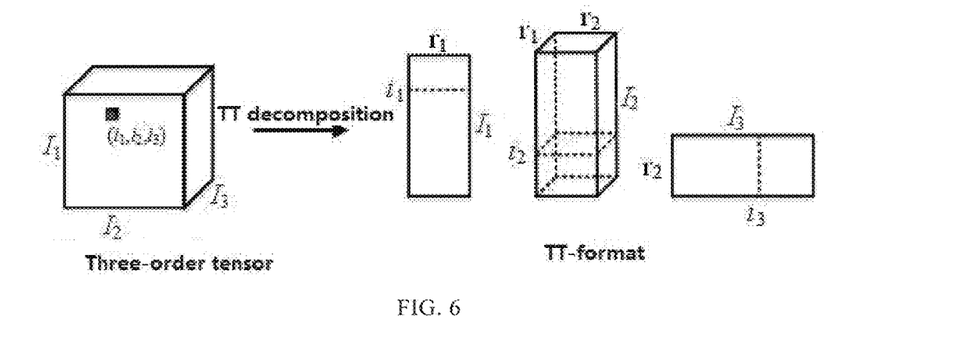
FIG. 6 is a schematic diagram of a third-order tensor performing tensor train decomposition.

3. as shown in FIG. 6, a tensor train rank r of the d-order tensor is defined, wherein $r_k$ represents a rank of a matrix of an original tensor after removing the first (k−1)-th order effect and unfolded along the k-th order of the tensor, wherein r0=rd=1 is a constrained condition; a tensor train rank defined here is 3.

4. tensor train decomposition is performed for the d-order tensor, and a tensor train decomposition representation of the full connection weight matrix is obtained, that is, $\mathcal{A} = \mathcal{G}_1 \mathcal{G}_2 \ldots \mathcal{G}_d$., wherein $\mathcal{G}_k$ is a three-order tensor with a scale of $r_{k-1} \times I_k - r_k$, $I_k$ represents the dimension of the k-th order of a high order tensor. In this embodiment, the original 700×32×28 three-order tensor is decomposed into three kernel tensors of 1×700×3, 3×32×3, and 3×28×1. The full connection layer weight decreases from the original 627200 parameters to 2472 parameters.

In order to show the compacting effect of TT decomposition (tensor train decomposition) for a full connection layer weight parameter quantity more clearly, parameter scales before and after tensor train decomposition in several reconfiguration schemes are calculated as shown in the following table. From the calculation results in the table, it can be seen that the parameter quantity of the full connection layer weight parameters decreases hundreds of times after tensor train decomposition, it is able to improve algorithm efficiency, reduce requirements for hardware, facilitate implementation of the teaching assistance system in embedded devices, and improve real-timeliness of detecting abnormal behaviors of students in class.

| Scale of full connection matrix | Reconfiguration schemes | | | |
| --- | --- | --- | --- | --- |
| | Rows | Columns | High-order tensors | Scales after tensor train decomposition |
| 800 × 784 = 627200 | 25 * 32 | 28 * 28 | 700 × 896 | 1 * 700 * 3 + 3 * 869 * 3 = 4788 |
| | 25 * 8 * 4 | 28 * 4 * 7 | 700 × 32 × 28 | 1 * 700 * 3 + 3 * 32 * 3 + 3 * 28 * 1 = 2472 |
| | 5 * 5 * 8 * 4 | 4 * 7 * 4 * 7 | 20 × 35 × 32 × 28 | 1 * 20 * 3 + 3 * 35 * 3 + 3 * 32 * 3 + 3 * 28 * 1 = 747 |
| | 5 * 5 * 4 * 2 * 2 | 2 * 2 * 7 * 2 * 2 * 7 | 10 × 10 × 28 × 4 × 4 × 14 | 1 * 10 * 3 + 3 * 10 * 3 + 3 * 28 * 3 + 3 * 4 * 3 + 3 * 4 * 3 + 3 * 14 * 1 = 484 | q22, establishing a loss function according to a difference between the output predict value and a real labeled value for a student having abnormal behavior in the student image;

q23, adjusting network parameters according to the loss function, and obtaining the trained depth tensor train network model.

5. by a back propagation algorithm, according to a loss function L formed by a difference between the output predict value and a real labeled value for a student having abnormal behavior in the original image (here, the loss function adopts a square sum error loss function, which will be introduced in detail below), network parameters are adjusted to predetermined accuracy, and the network parameters are stored.

The loss function uses a square sum error loss function, includes three parts: a coordinate prediction function, a confidence prediction function including a recognition box for students having abnormal behaviors, and a confidence prediction function not including a recognition box for students having abnormal behaviors.

$$L = \lambda_{coord} \sum_{i=0}^{S^2} \sum_{j=0}^{B} \Gamma_j^{obj}[(x_i - \hat{x}_i)^2 + (y_i - \hat{y}_i)^2] +$$

$$\lambda_{coord} \sum_{i=0}^{S^2} \sum_{j=0}^{B} \Gamma_j^{obj}\left[\left(\sqrt{w_i} - \sqrt{\hat{w}_i}\right)^2 + \left(\sqrt{h_i} - \sqrt{\hat{h}_i}\right)^2\right] +$$

$$\sum_{i=0}^{S^2} \sum_{j=0}^{B} \Gamma_j^{obj}(C_i - \hat{C}_i)^2 + \lambda_{noobj} \sum_{i=0}^{S^2} \sum_{j=0}^{B} \Gamma_j^{noobj}(C_i - \hat{C}_i)^2$$

wherein, x, y are coordinates of a central position of a recognition box for students having abnormal behaviors, w, h are the width and height of the recognition box for students having abnormal behaviors, $\Gamma_{ij}^{obj}$ is determining whether the j-th recognition box in the i-th grid unit is configured to detect, $\Gamma_i^{obj}$ determining whether a center of a student having abnormal behaviors falls within a grid unit $\lambda_{coord}$ is a coordinate prediction weight, $\lambda_{noobj}$ is a confidence weight of a recognition box not including any student having abnormal behaviors.

Figure 11:
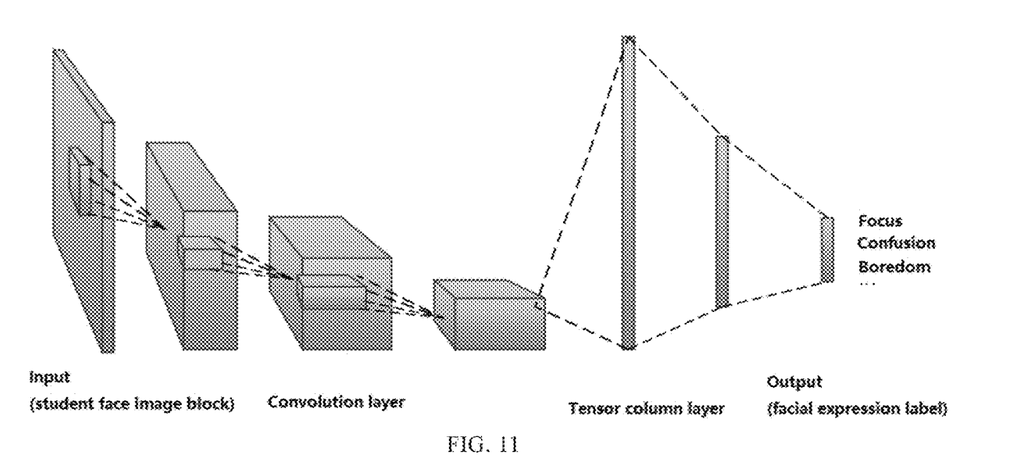
FIG. 11 is a structural schematic diagram of a depth tensor train network model adopted by facial expression recognition.

In a preferred embodiment, as shown in FIG. 10 and FIG. 11, when training a depth tensor train network model for facial expression recognition, a human face detection network model is first trained. Human face detection is similar to the classroom abnormal behavior detection model of the behavior detection sub-module, wherein the classroom abnormal behavior data set is replaced with a humane face detection data set, an image input model in the humane face detection data set is used to train, and it is possible to repeat the training processes 1-5 of the humane face detection data set, such that the model can automatically learning human face features, and automatically detect students' face positions in the classroom image.

Second, when training classroom human face expression recognition, a convolutional neural network (CNN) classifier is adopted. Students' facial image blocks with facial expression labels in the students' learning facial expression data set established above are input into a facial expression recognition classifier, so as to train the facial expression recognition network model. The facial expression recognition network model is as shown in FIG. 11.

1. initializing facial expression recognition network model parameters.

2. inputting students' facial image blocks with facial expression labels in a constructed facial expression data set of students in class into the model to train.

3. the students' facial image blocks are continuously convoluted and pooled, and facial expression features are extracted.

4. by improved full connection, predicted facial expression labels of students' facial image blocks are output. Here, TT decomposition is also performed for the full connection layer weight matrix. The specific process is illustrated in detail in the behavior detection sub-module (4), and is not repeated here.

5. by a back propagation algorithm, according to a loss function L formed by a difference between the output predict value and a real labeled facial expression label, network parameters are adjusted to predetermined accuracy, and the network parameters are stored.

In other embodiments, in order to search accuracy of model learning, a model test step is further included.

When performing a test for behavior detection; the above trained network model parameters are introduced into a depth tensor train network of the behavior detection sub-module in the recognition module; a classroom image realtimely captured by the image capturing module is input; and whether there is a student having abnormal behaviors in the image is detected in real time; if there is, the student is labeled, the recognition result is provided to the teaching teacher by the prompting module, and is stored by the storage module, so as to perform further analyze and mine data in the future. Whether there is an abnormal behavior is determined according to whether an abnormal behavior probability provided by the network model is greater than a given probability threshold value, it is default that the probability threshold value has been tested many times, and a rational value, which meets public needs and can balance sensitivity and accuracy well, is given. The teacher can make proper adjustments according to personal situations in the future, such that the teaching assistance system is more humanized. During the test, it is possible to make proper adjustments in details according to existing problems, so that the system achieves the best status and is put into actual use.

When performing a test for facial expression recognition, the above trained network model parameters are introduced into the facial expression recognition sub-module in the recognition module; a classroom image real-timely captured by the image capturing module is input; first, the human face detection network model detects all human face positions in the image, and then the detected human face image blocks are simply processed, adjusted into fixed sized, and input into the facial expression recognition network model to recognize facial expressions of students in class. In this way, the model automatically detect human faces and recognize their facial expression features, such that the model can be put into actual use, detect and analyze facial expression information of students in class in real time; in combination with the result of the behavior detection module, it is convenient for a teaching teacher to understand a learning state of each student in class more accurately and real-timely, such that the teaching teacher can be more targeted and improve teaching quality and efficiency.

In order to solve the above technical problem, the present disclosure further provides a teaching assistance system, which is provided with a capturing module, a recognition module connected with the capturing module, and a prompting module connected with the recognition module.

The capturing module is configured to capture a classroom image in the scene in real time, and transmit the classroom image to the recognition module.

The capturing module is as shown in FIG. 9. Capturing objects of the image capturing module are upper body images of all students in a class. A capturing method comprises: mounting image capturing devices at left, middle, and right top ends of a wall in the front of a classroom respectively, adjusting photographing angles to prevent blocking and combine several visual angles, setting a time interval of each photographing of the image capturing devices, processing captured images into sizes required by the recognition module and transmitting the images to the recognition module, thereby providing data for performing class behavior recognition.

The recognition module is configured to analyze the classroom image, and determine students with abnormal behaviors in the classroom image; it specifically includes the following unit:

a behavior detection unit configured to use a trained depth tensor train network model to perform behavior detection for students in the classroom image.

Specifically, a purpose of the recognition module is to recognize special class behaviors and facial expressions of students in class in the image capturing module to determine whether the students are learning carefully, and thereby understand acceptance extent of the students to the taught content. A behavior method comprises: first, capturing image data of students in class in the classroom, making manual annotations for the image to mark abnormal students therein, that is, students learning not carefully, which specifically include students sleeping, talking, making petty actions, dazing, etc.; using a constructed class behavior image data set to train a depth tensor train network model, so that the recognition module can automatically learn image features and detect abnormal behaviors of students in images; finally, putting a trained model into actual use, real-timely acquiring three images transmitted from the image capturing module (the present disclosure takes three image as example to illustrate; in the condition that hardware equipment allows, more images can be captured in real time), respectively detecting abnormal behaviors of students in images, and framing students having abnormal behaviors according to a given probability threshold value.

The prompting module is configured to inform a teaching teacher with a recognition result of the recognition module.

Regarding the prompting module, the prompting module real-timely informs a teaching teacher with the synthesis of the recognition result in a certain manner; if the images in three angles have no abnormality, it does not inform; the teacher can adjust the recognition sensitivity by adjusting the probability threshold value. Upon reception of the prompt, the teacher can real-timely understand learning states and acceptance extents to the taught content of the students in the classroom, and based on this, can emphatically ask students with poor acceptance extents or adopt corresponding measures.

Preferably, the teaching assistance system is further provided with a storage module connected with the recognition module; the storage module is configured to synchronously store the recognition result and perform edit and analysis.

Regarding the storage module, the storage module is configured to store final results of all recognitions of the system in the form of students' personal profiles, wherein the class is taken as a large category and the students are taken as small categories. A school can fully utilize these electronic profiles and find useful information therefrom; in one aspect, it is possible to analyze and estimate defects in teaching according to the whole acceptance situation of the students; in another aspect, it is possible to analyze learning curves of students, find real reasons of bad scores of students, and thus perform defect checking and error correction targetedly.

The recognition module further includes:

a facial expression recognition unit configured to use the trained depth tensor train network model to perform facial expression recognition for students in the classroom image.

The facial expression recognition unit includes a human face detection sub-unit and a convolutional neural network classifier.

A method of the facial expression recognition sub-module is similar to behavior detection, and the difference is marking abnormal facial expressions to perform algorithm training. The present disclosure describes in a parallel recognition manner in which the two sub-modules are distinguished by the same algorithm model, but can also change a loss function to merge two tasks into the same model by a multi-task loss function to recognize, here it is not specifically described, but is also within the protection scope of the present disclosure.

The solutions required for protection by the present disclosure well solve the technical problem of assistance teachers to perform teaching activities by performing analyze and processing for classroom images; avoids the defect that existing teaching devices depend too much on external image recognition devices and result in high requirement for hardware and inaccuracy recognition, and improves teaching working efficiency of teachers.

The above content is merely preferred embodiments of the present disclosure, and is not intended to limit implementing solutions of the present disclosure. One of ordinary skill in the art can make corresponding changes or modifications conveniently according to main conception and spirit of the present disclosure. Therefore, the protection scope of the present disclosure should be subject to the protection scope claimed by the claims.

What is claimed is:

1. A teaching assistance method, comprising the following steps:
   - s1, by a capturing module, capturing a classroom image in the scene in real time, and transmitting the classroom image to a recognition module;
   - s2, by the recognition module, analyzing the classroom image, and determining students with abnormal behaviors in the classroom image;
   - s3, by a prompting module, informing a teacher with a recognition result of the recognition module;
   - wherein, the step s2 includes the following step:
   - s21, by the recognition module, using a trained depth tensor network model to perform behavior detection for students in the classroom image;
   - wherein the trained depth tensor network model is established by steps of:
   - initializing network model parameters;
   - inputting images in a constructed abnormal behavior data set of students in class into a model to train;
   - convoluting and pooling the images, and outputting a S×S×m tensor A at the last convolution layer;
   - outputting a S×S×(5a) tensor by an improved full connection; and
   - by a back propagation algorithm, according to a loss function L formed by a difference between an output predict value and a real labeled value for a student having abnormal behavior in an original image, adjusting the network model parameters to predetermined accuracy, and storing the adjusted network model parameters.

2. The teaching assistance method according to claim 1, wherein, the step s2 further includes the following step:
   - s22, by the recognition module, using a trained depth tensor network model to perform facial expression recognition for students in the classroom image.

3. The teaching assistance method according to claim 2, wherein, the step s22 specifically includes the following steps:
   - s221, by a human face detection sub-unit, recognizing human face regions of the students in the classroom image captured by the capturing module;
   - s222, by a convolutional neural network classifier, performing facial expression recognition for detected human face regions.

4. The teaching assistance method according to claim 1, wherein, the step s1 includes the following steps:
   - s11, by the recognition module, respectively mounting image capturing devices in left, middle, and right regions in the front of a classroom;
   - s12, by the image recognition module, taking upper body images of all students in a class as capturing targets.

5. The teaching assistance method according to claim 1, further comprising the following step:
   - s4, by a storage module, synchronously storing the recognition result.

6. The teaching assistance method according to claim 5, wherein, the step s4 includes the following steps:
   - s41, according to classes, making the recognition result corresponding to each student into a student electronic profile;
   - s42, according to the student electronic profiles, drawing student learning status curves, which are configured to facilitate a teacher to give targeted guidance to students in combination with currently taught content and test scores.

7. The teaching assistance method according to claim 1, wherein, before the step s1, the method further comprises the following steps:
   - q1, establishing a data set;
   - q2, training the depth tensor network model.

8. The teaching assistance method according to claim 7, wherein, the step q 1 includes the following steps:
   - q11, by the capturing module, photographing class images for a long time in the classroom and storing the class images;
   - q12, selecting a student image existing abnormality to label.

9. The teaching assistance method according to claim 8, wherein, the step q2 includes the following steps:
   - q21, by multiple convolution layers of a neural network model, extracting a labeled abnormal feature in a student image, and calculating according to the abnormal feature and a decomposed full connection layer weight matrix to obtain an output predict value;
   - q22, establishing a loss function according to a difference between the output predict value and a real labeled value for a student having abnormal behavior in the student image;
   - q23, adjusting network parameters according to the loss function, and obtaining the trained depth tensor network model.

10. The teaching assistance method according to claim 1, wherein, the outputting a S×S×m tensor A at the last convolution layer includes:
    - dividing an original image into a S×S grid, wherein each grid unit
    - corresponds to a part of an original classroom image, and image features in each grid unit corresponds to a m-dimensional vector in the tensor.

11. The teaching assistance method according to claim 10, wherein, the outputting a S×S×(5a) tensor by an improved full connection includes:
    - detecting abnormal behavior student detection bounding box coordinates (x, y, w, h), of which the number is a, corresponding to each grid unit and a recognition box as the confidence of a student with abnormal behaviors; wherein x and y are coordinates of the center point of the recognition box of the student with abnormal behaviors, w and h are respectively a width and a height of the recognition box of the student with abnormal behaviors, and the coordinates are normalized to be between 0 and 1.

12. The teaching assistance method according to claim 1, wherein, the loss function L is a square sum error loss function including three parts: a coordinate prediction function, a confidence prediction function including a recognition box for students having abnormal behaviors, and a confidence prediction function not including are cognition box for students having abnormal behaviors.

13. The teaching assistance method according to claim 12, wherein, the loss function L is calculated by the following formula:

$$L = \lambda_{coord} \sum_{i=0}^{S^2} \sum_{j=0}^{B} \Gamma_j^{obj} [(x_i - \hat{x}_i)^2 + (y_i - \hat{y}_i)^2] +$$

$$\lambda_{coord} \sum_{i=0}^{S^2} \sum_{j=0}^{B} \Gamma_j^{obj} \left[ \left( \sqrt{w_i} - \sqrt{\hat{w}_i} \right)^2 + \left( \sqrt{h_i} - \sqrt{\hat{h}_i} \right)^2 \right] +$$

-continued
$$\sum_{i=0}^{S^2}\sum_{j=0}^{B}\Gamma_j^{obj}(C_i-\hat{C}_i)^2 + \lambda_{noobj}\sum_{i=0}^{S^2}\sum_{j=0}^{B}\Gamma_j^{noobj}(C_i-\hat{C}_i)^2$$

wherein, x, y are coordinates of a central position of a recognition box for students having abnormal behaviors, w, h are the width and height of the recognition box for students having abnormal behaviors, $\Gamma_{ij}^{obj}$ is determining whether the j-th recognition box in the i-th grid unit is configured to detect, $\Gamma_i^{obj}$ is determining whether a center of a student having abnormal behaviors falls within a grid unit i, $\lambda_{coord}$ is a coordinate prediction weight, and $\lambda_{noobj}$ is a confidence weight of are cognition box not including any student having abnormal behaviors.

* * * * *